United States Patent [19]
Sokal et al.

[11] Patent Number: 5,953,504
[45] Date of Patent: Sep. 14, 1999

[54] PUBLIC ACCESSIBLE TERMINAL CAPABLE OF OPENING AN ACCOUNT FOR ALLOWING ACCESS TO THE INTERNET AND E-MAIL BY GENERATING ID CODE AND SECURITY CODE FOR USERS

[75] Inventors: Wayne G. Sokal, Dugald; Kevin R. Carthy, Winnipeg, both of Canada

[73] Assignee: Suntek Software Corporation, Manitoba, Canada

[21] Appl. No.: 08/541,727

[22] Filed: Oct. 10, 1995

[51] Int. Cl.⁶ .................................................. G06F 13/00
[52] U.S. Cl. .................. 395/200.57; 379/91.01; 379/93.22; 379/93.24; 379/100.04; 379/100.12
[58] Field of Search ....................... 238/380; 379/100.15, 379/114, 91.01, 93.22, 93.24, 100.04, 100.12; 705/32; 707/104; 395/200.57

[56] References Cited

U.S. PATENT DOCUMENTS

| | | |
|---|---|---|
| 4,816,911 | 3/1989 | Kirsch et al. ...................... 379/100.15 |
| 5,206,488 | 4/1993 | Teicher ..................................... 235/380 |
| 5,267,147 | 11/1993 | Harshaw et al. .......................... 705/32 |
| 5,552,586 | 9/1996 | Kalman ................................... 238/380 |
| 5,566,327 | 10/1996 | Sehr ........................................ 707/104 |
| 5,590,181 | 12/1996 | Hogan et al. ............................ 379/114 |

*Primary Examiner*—Thomas C. Lee
*Assistant Examiner*—David Ton
*Attorney, Agent, or Firm*—Adrian D. Battison; Murray E. Thrift

[57] ABSTRACT

A computer network for allowing individual users to access the internet comprises a central unit and a plurality of individual terminals located at separate spaced locations, at least which are accessible to the public. Each public accessible unit includes a touch screen monitor/keyboard, central processing unit, telephone line communication through a modem and a system for payment of funds by the public for use of the system. Payment can be made by a card reader, bill reader or a coin reader.

12 Claims, 5 Drawing Sheets

PUBLIC ACCESSIBLE TERMINAL CAPABLE OF OPENING AN ACCOUNT FOR ALLOWING ACCESS TO THE INTERNET AND E-MAIL BY GENERATING ID CODE AND SECURITY CODE FOR USERS

BACKGROUND OF THE INVENTION

This invention relates to a method of providing communication between a plurality of individual users and the internet which method includes providing a plurality of stand alone terminals at separate locations, at least some of the locations being accessible to the public.

The internet is becoming more important each day with the number of users increasing dramatically.

Many more sophisticated persons have appreciated the importance of this development and have therefore themselves acquired the knowledge and techniques for connection to the internet. However many less sophisticated persons as yet remain unconvinced and are unwilling to invest the time and money involved in obtaining the knowledge and hardware necessary for connection.

It is one object of the present invention, therefore, to provide an improved technique for allowing individual users to access the internet by providing a series of stand alone terminals at a plurality of separate locations, at least some of which are accessible to the public.

Terminals are presently available which allow some access to computer networks particularly for purposes of allowing the public to access manufacturer generated documents for obtaining information on and allowing purchase of products. These terminals allow access to the network without monetary charge and are based upon income generated by the advertising costs to the manufacturer. However these terminals do not allow general access to the internet since access is limited to those manufacturers who are willing to pay for the advertising time.

It is also known to provide vending of software in which a computer terminal is provided in a housing accessible to the public and includes a credit card reader for accessing funds from the user together with a memory drive for receiving a memory element (particularly a floppy disk) on which a purchased program can be written for the user.

However at the present time there is no terminal available which will allow public access to a secure terminal while allowing the user from the public to enter payment and to access the internet for a payment received from the user.

SUMMARY OF THE INVENTION

According to one aspect of the invention there is provided a method of providing communication between a plurality of individual users and the internet, the method comprising: providing a server unit having means for connection to the internet for communication between the server unit and the internet; providing a plurality of individual terminals located at separate spaced locations at least some of which are accessible to the public; connecting each terminal to the server unit for communications therebetween; providing in each individual terminal;

A) a housing in a location so as to be accessible by a user, the housing being arranged to provide security for elements contained therein to prevent access thereto except for authorized operation by the user;

B) a monitor screen mounted on the housing so as to be viewable by the user;

C) a central processing unit mounted in the housing;

D) payment means mounted on the housing for receiving payment of fees by the user;

E) a memory element drive module mounted in the housing and allowing access by the user to insert and remove memory elements;

F) communication means in the housing operable by the user for communication of information and instructions from the user to the central processing unit;

causing the central processing unit to display on the monitor screen a menu selectable by the user including the following functions;
  a) access to the internet;
  b) open an account to access the internet;
  c) open an account to receive and send E-mail;
  d) read E-mail;
  e) send E-mail;

and causing the central processing unit and the server to effect the following functions;

i) on selection of a), to connect the central processing unit through the server unit to the internet for direct communication of the user with the internet, to calculate fees for a period of time of said connection and to allow said direct communication for a period of time dependent upon fees paid by the user;

ii) on selection of b), to generate a series of questions to the user, to display the questions on the monitor screen, and to communicate information input into said communication means by the user in response to the questions to the server unit, said questions and information including information on the identity of the user, and including generation of an ID code and a security code for allowing access to the internet for the user through the server;

iii) on selection of c), to generate a series of questions to the user, to display the questions on the monitor screen, and to communicate information input into said communication means by the user in response to the questions to the server unit, said questions and information including information on the identity of the user, and including generation of an ID code and security code for allowing sending and receiving of E-mail through the server;

iv) on selection of d), to generate a series of questions to the user, to display the questions on the monitor screen, to require the user to enter said ID code and said security code for allowing receiving E-mail through the server, and in response to said ID code and security code to transmit any E-mail for the user to the terminal, said terminals and server begin arranged such that the user can read said E-mail at any one of the terminals;

v) on selection of e), to generate a series of questions to the user, to display the questions on the monitor screen, to require the user to enter said ID code and said security code for allowing sending E-mail through the server, and in response to said ID code and security code to transmit any E-mail for the user from the terminal to the server.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
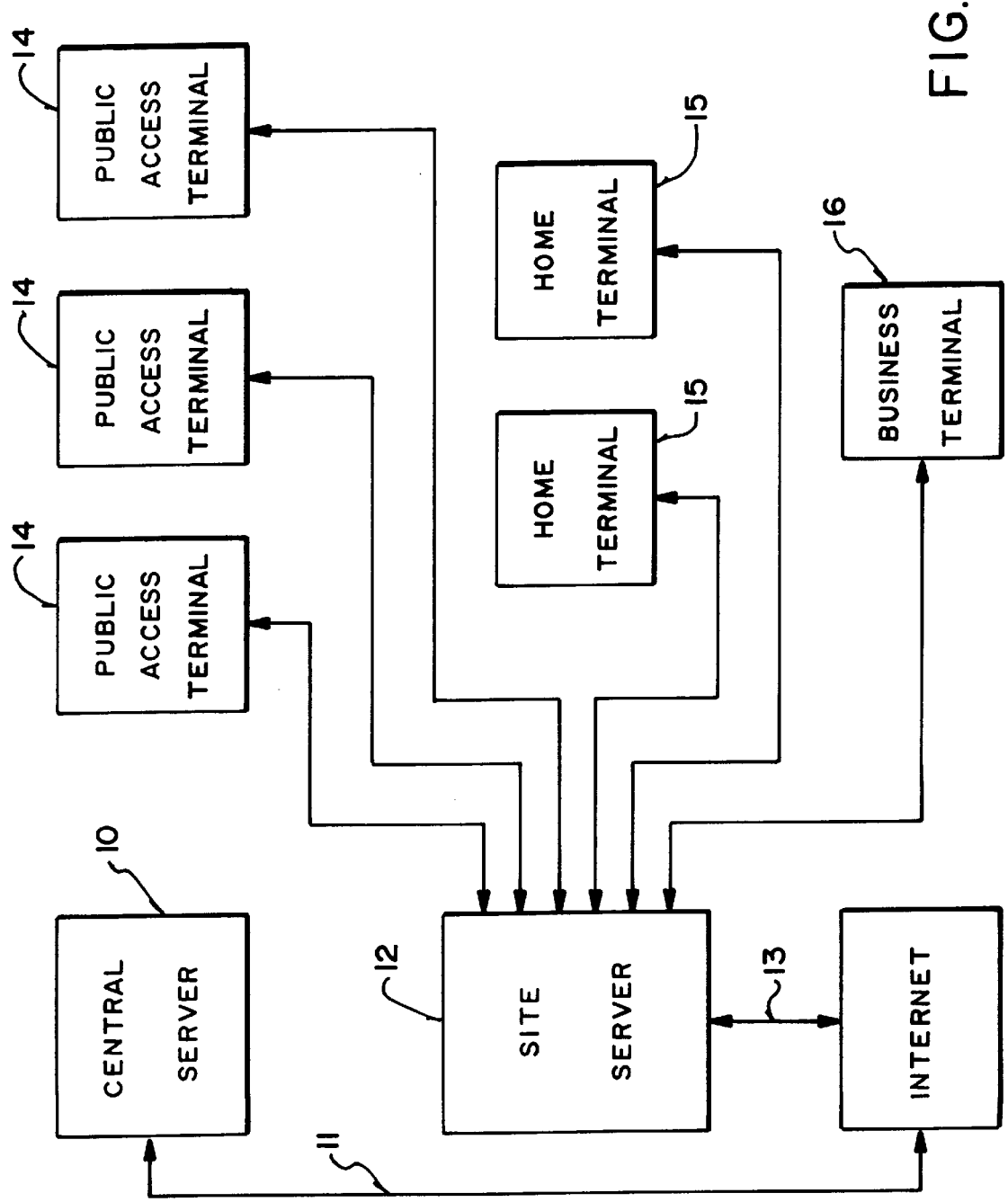
FIG. 1 is a schematic illustration of the network providing the public access terminals for accessing the internet according to the present invention.

The network of FIG. 1 includes a central server 10 having a connection 11 for communication with the internet. The system further includes a plurality of site servers each arranged at a number of separate locations for example in separate cities. Each site server has a connection 13 to the internet so that communications through the internet can be effected from the central server to the site server. Each of the site servers is arranged so that it exchanges information with the central server so that the central server acts to maintain an exact copy of the information on each of the site servers and the site servers act to maintain a copy of the relevant information from the central server which is relevant to that particular site server.

Each site server has local access through the local telecommunications network to a plurality of terminals including a plurality of public access terminals 14, a plurality of home terminals 15 and a plurality of business terminals 16. In practice the home terminals and the business terminals will comprise generally a PC available to the individual user with the communication from the site server to each of the home and business terminals being affected via a modem through the local telecommunications network in a conventional manner.

In addition to the conventional PC terminals 15 and 16, the site server communicates with each of the public access terminals for which the present invention is concerned and these public access terminals are located ins separate spaced locations accessible to the public for example in airports, malls, office buildings and other suitable locations to which the public have access but relative security can be maintained to prevent unauthorized damage to the machines.

Figure 2:
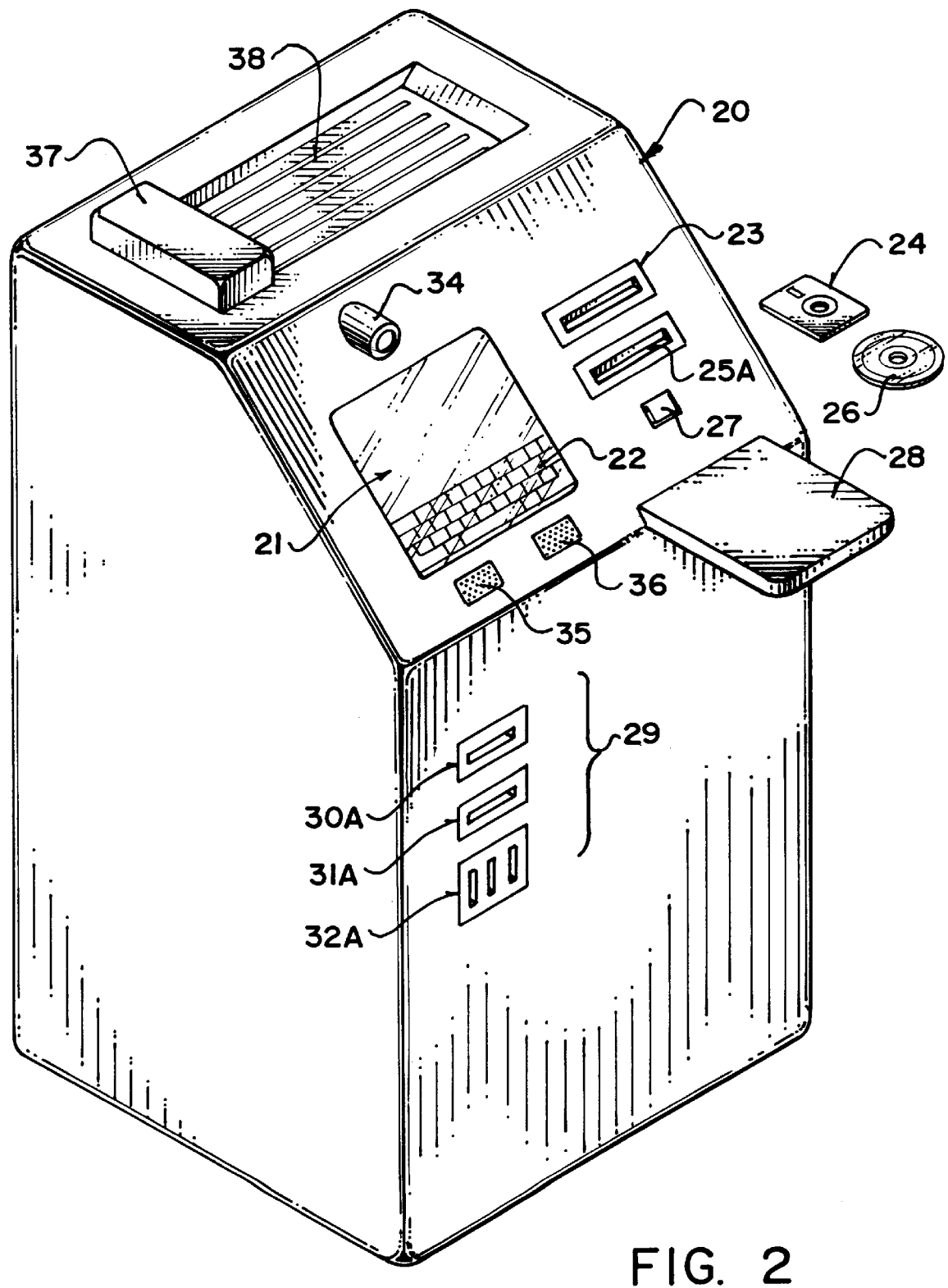
FIG. 2 is an isometric view of one public access terminal of FIG. 1.
Figure 3:
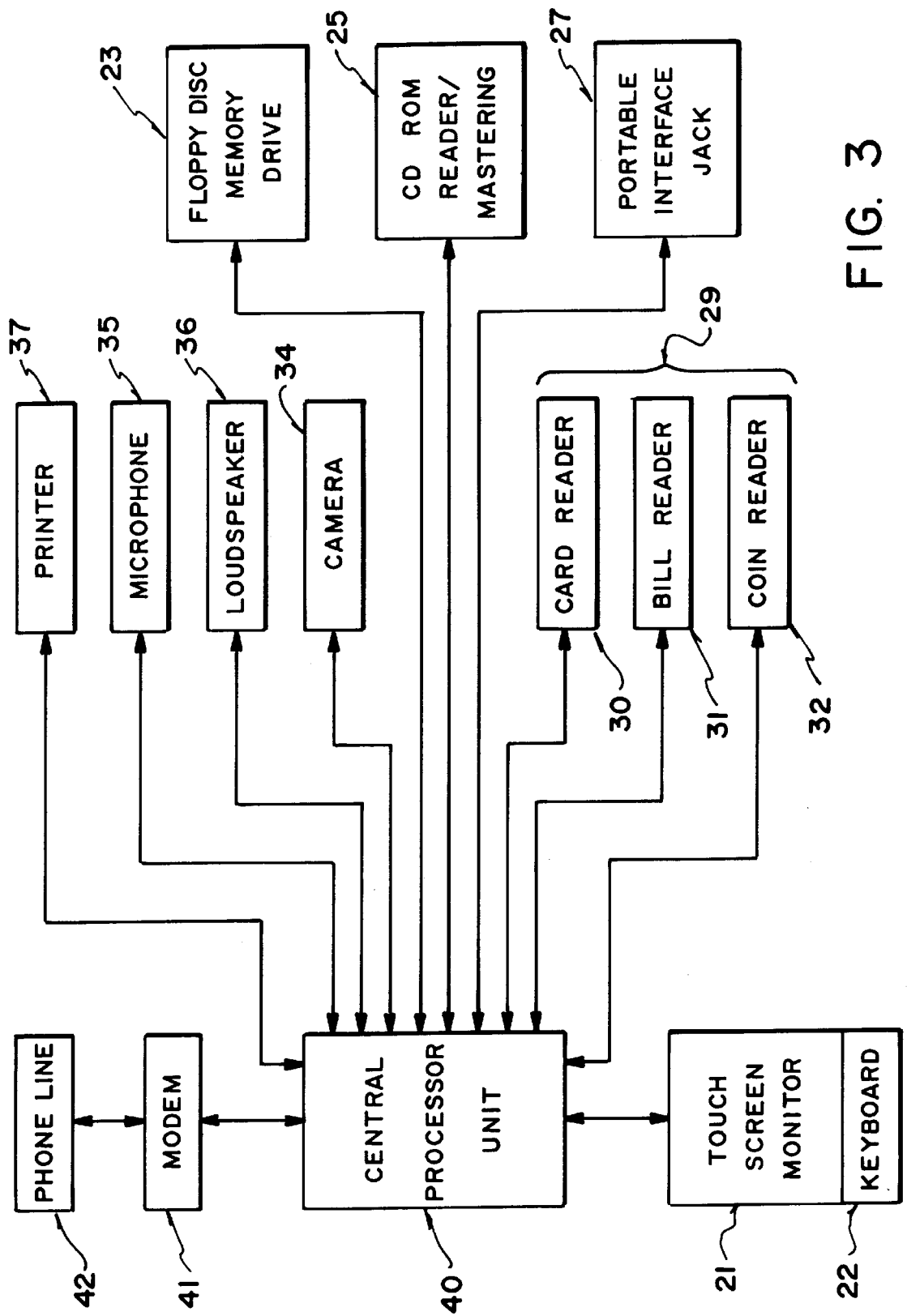
FIG. 3 is a schematic illustration of the layout of the elements of the terminal of FIG. 2.

The construction and schematic layout of the public access terminal is shown in FIGS. 2 and 3.

The terminal of FIGS. 2 and 3 comprises a secure housing 20 which contains all of the elements of the terminal so as to prevent unauthorized access. Generally the housing fully contains all of the elements and presents only the publicly operable portion of each element at a surface of the housing. Thus the housing supports touch screen monitor 21 of the type which displays information on the screen and allows communication of information from the user through a touch sensitive system on the screen. This allows the user to select one element of a menu for simple and rapid insertion of information with the touch screen also including a key pad section 22 which allows the user to enter more detailed information by typing from the keypad.

The housing further supports and presents a memory drive 23 for receiving memory elements 24 (which are currently in the form of floppy disks) which can of course be inserted through a slot into the drive system behind the slot presented at the surface of the housing. The housing further contains a CD ROM reader and mastering unit 25 again having an insert slot section 25A at the surface of the housing for receiving CD's 26 and for mastering such CDs from information supplied to the unit 25.

A portable computer interface is provided at 27 in the form of a jack mounted in the surface of the housing with a support surface 28 provided for carrying the portable computer on the terminal housing. A user can therefore communicate with the terminal by operating the personal or portable computer which provides input into the system while bypassing the touch screen.

A system for inputting fees into the housing is mounted on a front face of the housing and includes input sections 29 defined by a card reader 30, a bill reader 31 and a coin reader 32 each of which has an input section 30A, 31A and 32A on the front face of the housing. In this way a person approaching the terminal can enter funds or fees into the terminal by insertion of a credit card into the slot 30A, or by insertion of paper money through the slot 31A or by insertion of coin money through the slots 32A.

A camera 34 is located in the housing at a position to view the user when standing at the monitor 21 so that the user when viewing the monitor can also be viewed by the camera 34. A microphone 35 and a loudspeaker 36 are positioned in the housing at a location to allow communication with the user again while standing at the monitor 21.

A high quality laser printer 37 is located in the upper surface of the housing with a receptacle 38 for printed sheets thus allowing the user to print information from the terminal either that which is displayed on the screen or that which is transmitted to the terminal or supplied to the terminal through one of the readers 23 or 25.

The terminal further includes a central processing unit 40 which is connected to each of the elements previously described and communicates through a modem 41 to a phone line 42 of the local telecommunications network for communication to the site server.

In operation, the terminal is set up so as to scroll through a series of display pictures on the screen 21 when the terminal is inactive so as to provide an attractive appearance acting as a selling point for the terminal to attract potential customers.

Once the terminal is activated by a potential user for example by touching the screen 21, the home page is brought up onto the screen generated by the central processor unit. The home page is an information screen which provides written information to the potential user and provides a series of selectable functions or menu which the user can select.

Figure 4:
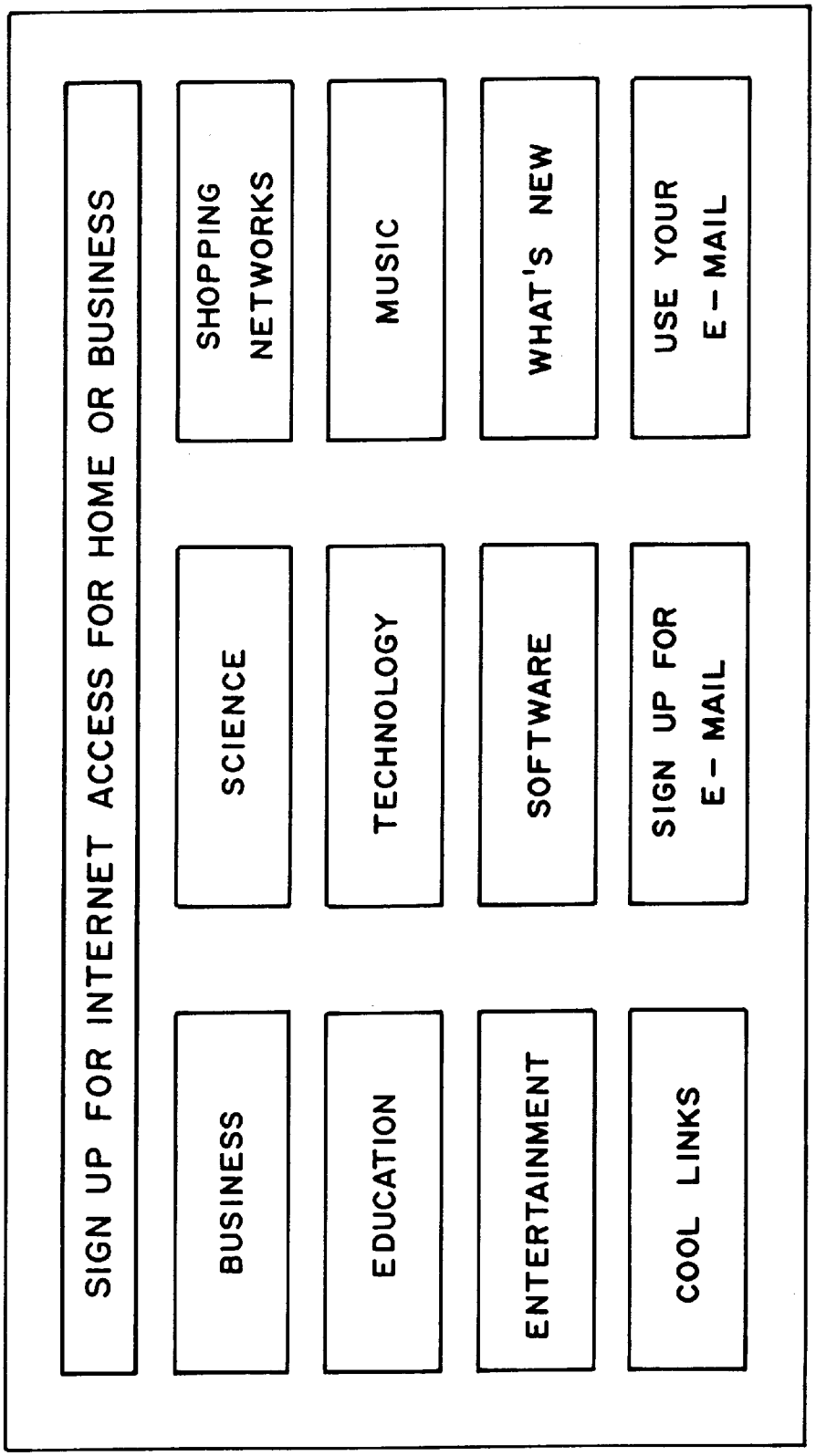
FIG. 4 is a graphic illustration of the home page which will be access by a public user as a first menu available on the touch screen.

A typical home page is shown in FIG. 4 and includes the following selectable features in a menu:

1. Access to the Internet by selecting one of a plurality of available categories of required information available on the internet as set out in FIG. 4.
2. Open an Account to access the Internet.
3. Open an Account to receive and send E-mail.
4. Use (read or send) E-mail.

The user is therefore free to select a required one of the available features from the menu simply by touching the screen at the required display of the feature.

In the event that the user selects one of the features set forth above, the following functions are effected by the server and by the central processing unit.

In the event that the user selects menu feature no. 1, the central processor unit and the server operate to allow the user direct access to the internet so as to communicate freely on the internet as a conventional user on the internet.

However in order to obtain this connection, it is necessary for the user to input a suitable sum of money by selection of one of the modes of payment including the credit card, paper money or coins.

The screen is arranged by the central processor to display a cost of the service so that the user can enter a sum of money selected by the user to obtain a calculated period of use or the user can enter a credit card which will of course provide continual use.

In the event that the user enters the necessary sum of money, the central processor unit then acts to calculate the amount of time used by the user and to deduct that from the sum of money entered or to calculate the total amount for debit from the credit card.

Communication with the internet is effected by typing into the keypad 22 or by selecting from menus by the touch pad, depending upon the information communicated from the internet.

In the event that the user wishes to download information obtained, this can be loaded onto the memory elements 24 or printed onto paper by the printer 37.

It is the intention of this system that it be used by the general public to try out communication with the internet at a pay-per-view rate without the necessity for purchasing hardware or entering into a long term arrangement.

It is further the intention of the system that the terminal be owned and operated by persons different from those managing the server and system as a whole with the funds from the use being dedicated basically to the owner of the terminal.

It is yet further the intention that the funds for the system be obtained by ongoing subscriptions purchased through the terminal for connection into the internet either by further use of the terminal or by connection to a home terminal shown in FIG. 1. The second function of the menu is therefore the possibility of opening an account by the user to access the internet on an ongoing basis. It is the intention that the account would be related to the home terminal of the user or a business terminal of the user rather than the free standing public access terminal.

Therefore in the event that the user selects function no. 2 identified above, the central processor unit displays a screen putting forward a series of questions to the user including the following:

Name

Address

Phone No.

Fax No.

Computer type

Credit card

In addition the server generates for the user an ID code and secret password which will be continually used by the user and is used to identify that user in the server and to obtain access.

In the event therefore that the user opens an account, the user will be able to access the internet at any required location at any required time provided the user accesses the server through the local telecommunications network and the server then acts as a port to the internet allowing the user to access the internet in the conventional manner.

In the event that the user selects function no. 3, the central processor unit identifies the same series of questions as set forth above to allow the user to open the account to receive and send E-mail. This account is different from the account above in that it does not allow the user to access the internet but instead provides to the user an E-mail address on the server which acts as a port to the internet so that others on the internet can communicate E-mail to that user at the port defined by the server. On opening an account, therefore, the user can access the E-mail addressed to that user at any of the public access terminals or at a private terminal communicating with the server.

The user can therefore use a business or home terminal for receiving E-mail or if out of the office or out of the home can access the E-mail from any one of the public access terminals which are located in various publicly suitable locations. The business traveler can therefore access E-mail for example while traveling at airports without the necessity for transporting other hardware suitable for receiving E-mail and without the necessity for long distance telecommunications costs.

The accessing of the E-mail system for sending or receiving is effected by selecting function no. 4 and this selection requires the user to enter information including the USERID and password to the terminal on the screen in response to a series of questions.

In response to selection of function no. 4, the system brings up a further screen requesting whether the user wants to send or read the E-mail and the necessary details to complete the requested functions.

The E-mail system can also be used to send faxes in that the E-mail is converted to a fax by a local service and sent to the identified fax number.

In addition to the above 4 functions, the yet further functions as follows can be selected (not shown on FIG. 4):

5. Printer.

This function allows the user to utilize the high quality printer 37 to generate high quality printed copies from information on a memory element 24.

6. Tele-video conferencing.

This selection allows the user, on input of the necessary funds, to carry out tele-video conferencing with another of the terminals or a home or business terminal effecting communication through the camera, microphone and loudspeaker.

7. Desk top publishing.

This selection allows the user to utilize software in the terminal to generate printed pages.

8. CD ROM mastering.

This selection allows the user to utilize the CD ROM mastering unit 25 to generate records on CD for permanent storage without the necessity for purchasing a dedicated CD ROM mastering unit.

The fee payment system is normally implemented for each transaction by the user so that the fee must be entered to actuate the system for any of the menu features selected. However the fee requirement may be bypassed for the menu feature of opening an internet account in order to encourage or to avoid deterring this transaction.

The microphone and loudspeaker can also be used for voice synthesis and voice recognition allowing the terminal to be used by blind users.

The card reader 30 can also be used for reading smart cards supplied to the user by the system to identify the user to the terminal. On reading the smart card, therefore, the central processing unit can identify the user either as an individual or as a member of a class of users.

The identification can therefore be used for accounting purposes and for bypassing the ID questions relating to E-mail reading and sending.

Figure 5:
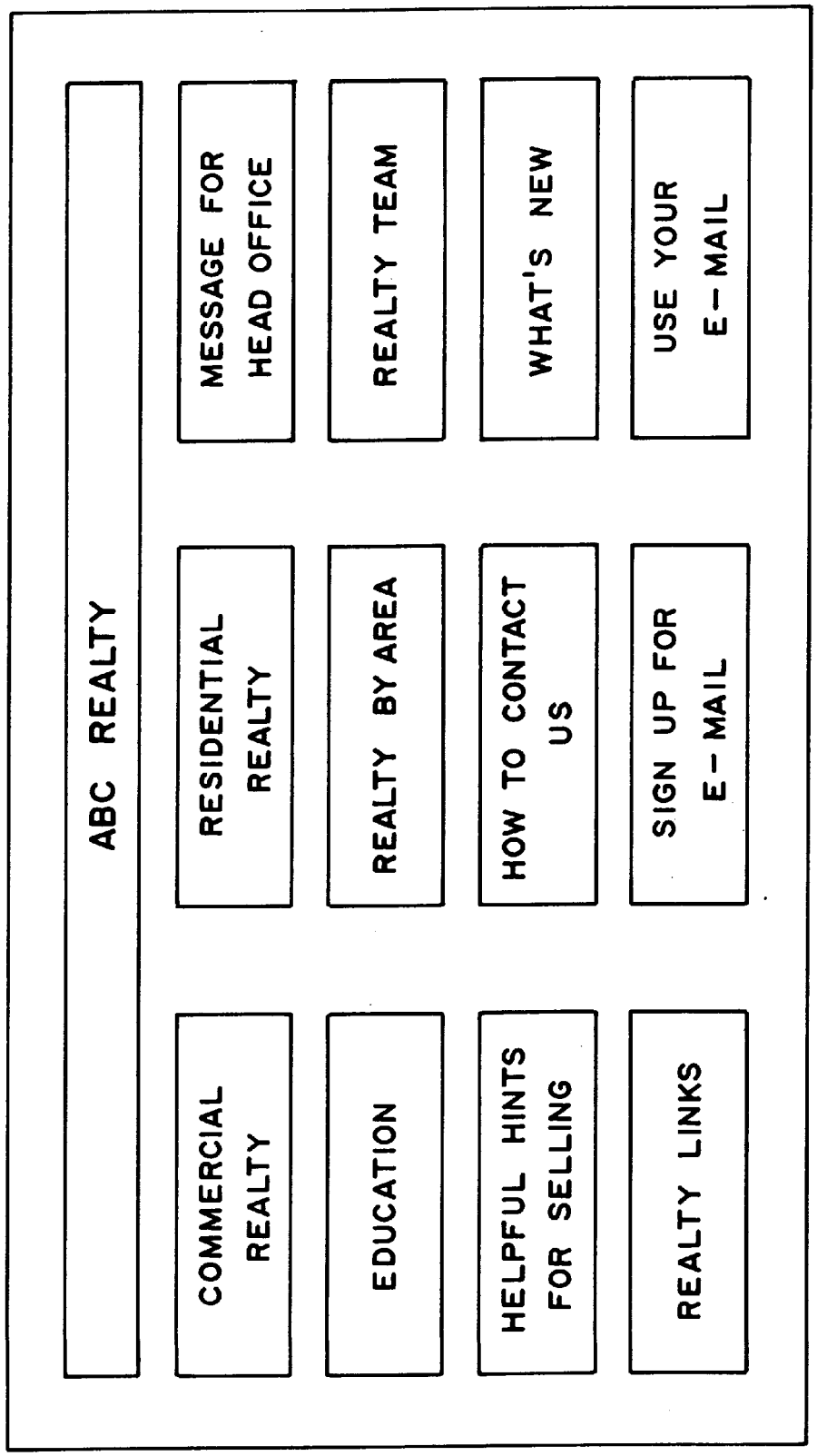
FIG. 5 is a graphic illustration of a sample home page for example for a Realty company which can be accessed by a corporate user having an access card identifying that user as one of a group or class of users.

When related to a class of users, that class can be provided with access to a separate menu allowing that class to access other information not available to the general public or to users who are not members of the class of users involved. Thus for example a company can set up a menu and information available to its employees and to provide each employee with a smart card. In this way on identifying the smart card of a member of the class, the central processing unit replaces the home page of FIG. 4 with a separate home page for example shown in FIG. 5. This separate home page provides a modified menu which allows the user of that class to identify and access other information for example as set out in the sample menu of FIG. 5. Generally the different menu excludes functions a), b) and c).

In order that the owner of the terminal, which is intended to be different from the operators of the network, to access information from the terminal concerning the amount of use, the central processor unit is arranged to store information concerning the total period of time of connection by users who have selected function a) and information concerning the number of users who have selected function b) and to provide said information to an authorized user, that is the owner, for purposes of calculation of fees.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A method of providing communication between a plurality of individual users and the internet, the method comprising:

providing a server unit having means for connection to the internet for communication between the server unit and the internet;

providing a plurality of individual terminals located at separate spaced locations at least some of which are accessible to the public;

connecting each terminal to the server unit for communications therebetween;

providing in each individual terminal;
   A) a housing in a location so as to be accessible by a user, the housing being arranged to provide security for elements contained therein to prevent access thereto except for authorized operation by the user;
   B) a monitor screen mounted on the housing so as to be viewable by the user;
   C) a central processing unit mounted in the housing;
   D) payment means mounted on the housing for receiving payment of fees by the user;
   E) a memory element drive module mounted in the housing and allowing access by the user to insert and remove memory elements;
   F) communication means in the housing operable by the user for communication of information and instructions from the user to the central processing unit;

causing the central processing unit to display on the monitor screen a menu selectable by the user including the following functions;
   a) access to the internet;
   b) open an account to access the internet;
   c) open an account to receive and send E-mail;
   d) use E-mail;

and causing the central processing unit and the server to effect the following functions;

i) on selection of a), to connect the central processing unit through the server unit to the internet for direct communication of the user with the internet, to calculate fees for a period of time of said connection and to allow said direct communication for a period of time dependent upon fees paid by the user;
   ii) on selection of b), to generate a series of questions to the user, to display the questions on the monitor screen, and to communicate information input into said communication means by the user in response to the questions to the server unit, said questions and information including information on the identity of the user, and including generation of an ID code and a security code for allowing access to the internet for the user through the server;
   iii) on selection of c), to generate a series of questions to the user, to display the questions on the monitor screen, and to communicate information input into said communication means by the user in response to the questions to the server unit, said questions and information including information on the identity of the user, and including generation of an ID code and security code for allowing sending and receiving of E-mail through the server;
   iv) on selection of d), to generate a series of questions to the user, to display the questions on the monitor screen, to require the user to enter said ID code and said security code for allowing using E-mail through the server, and in response to said ID code and security code to transmit any E-mail for the user to or from the terminal, said terminals and server begin arranged such that the user can read or send said E-mail at any one of the terminals.

2. The method according to claim 1 including causing the central processor unit to store information concerning the total period of time of connection by users who have selected function a) and information concerning the number of users who have selected function b) and to provide said information to an authorized user for purposes of calculation of fees.

3. The method according to claim 1 including providing in each individual terminal a smart card reader and providing for a plurality of authorized users a smart card identifying the user such that the smart card reader allows the central processing unit to identify the user on reading the smart card.

4. The method according to claim 3 wherein the central processor unit is arranged on reading a smart card of a class of users to provide a replacement menu different from said menu and accessible only by said class of users by using said smart card.

5. The method according to claim 4 wherein the different menu excludes functions a), b) and c).

6. The method according to claim 1 including providing in the housing a laser printer, laser printer being arranged to print information from the central processing unit and to deliver printed pages to the user.

7. The method according to claim 1 including providing in each terminal an interface connection for attachment to a portable computer of the user.

8. The method according to claim 1 including providing in each terminal a CD ROM mastering unit.

9. The method according to claim 1 including providing in each terminal a microphone and a loudspeaker and arranging the central processing unit relative to the microphone and loudspeaker for voice recognition and voice synthesizing.

10. The method according to claim 9 including providing in each terminal a television camera for generating an image of the user for transmission of the image through the server to other ones of the terminals.

11. The method according to claim 1 including providing a main server at a central location and a plurality of individual site servers, each site server having associated therewith a plurality of the terminals and providing connection between the site server and the main server so as to transmit information between the site server and the main server.

12. The method according to claim 1 including, when effecting function iv) arranging the central processor unit to download the E-mail to be read onto a memory element in the memory element drive module.

* * * * *